United States Patent [19]

Komatsu

[11] Patent Number: 5,319,172

[45] Date of Patent: Jun. 7, 1994

[54] MICROWAVE MELTING FURNACE FOR TREATING LIQUID

[75] Inventor: Fumiaki Komatsu, Kobe, Japan

[73] Assignee: Kabushiki Kaisha Kobe Seiko Sho, Kobe, Japan

[21] Appl. No.: 817,362

[22] Filed: Jan. 6, 1992

[30] Foreign Application Priority Data

Jan. 8, 1991 [JP] Japan .................. 3-000500

[51] Int. Cl.⁵ .............................................. H05B 6/80
[52] U.S. Cl. ...................................... 219/687; 219/759;
137/206; 210/195.1; 252/626
[58] Field of Search ............... 219/10.55 B, 10.57,
219/10.73, 10.55 A; 203/11; 55/16, 158;
210/195, 705; 252/626, 629, 630, 632; 137/206

[56] References Cited

U.S. PATENT DOCUMENTS

| 3,664,365 | 5/1972 | Ralet et al. ............... 137/206 |
| 3,748,421 | 7/1973 | Peterson .................. 219/10.55 A |
| 3,825,045 | 7/1974 | Bloomquist ............... 141/198 |
| 4,055,252 | 10/1977 | Klamm et al. ............. 209/74 M |
| 4,288,674 | 9/1981 | Councell ................... 219/10.55 A |
| 4,330,698 | 5/1982 | Sawada et al. ............ 219/10.55 A |
| 4,439,318 | 3/1984 | Hayashi et al. ........... 210/208 |
| 4,543,823 | 10/1985 | Nagy et al. ............... 73/304 C |
| 4,940,865 | 7/1990 | Johnson et al. ........... 219/10.55 A |

FOREIGN PATENT DOCUMENTS

| 3015300 | 10/1980 | Fed. Rep. of Germany . |
| 2359633 | 2/1978 | France . |
| 2198055 | 6/1988 | United Kingdom . |

OTHER PUBLICATIONS

Patent Abstracts of Japan, vol. 12, No. 4, (M-657), Jan. 8, 1988, & JP-A-62 168 673, Jul. 24, 1987, Kondo Kenji, "Soldering Device".

Primary Examiner—Bruce A. Reynolds
Assistant Examiner—Tu Hoang

[57] ABSTRACT

A microwave melting furnace for treating a liquid, comprising an upper furnace body, a lower furnace body, means disposed to the upper furnace body for supplying material to be treated, a crucible disposed in the lower furnace body, means for detecting the position for the upper surface of the material to be treated supplied into the crucible and a controller for stopping the means for supplying the material to be treated depending on a detection signal from the detection means. The liquid supplied to the crucible can be surely prevented from overflowing automatically.

3 Claims, 4 Drawing Sheets

MICROWAVE MELTING FURNACE FOR TREATING LIQUID

BACKGROUND OF THE INVENTION

1. Field of the Invention

The present invention concerns an improvement for a microwave melting furnace for or treating liquid.

2. Description of the Prior Art

Heating and melting treatment for non-metal materials by utilizing a dielectric heating phenomenon caused by the irradiation of a microwave has been generally used with an aim of disposing various kinds of industrial wastes and radioactive wastes in the form of liquid or slurry as a so-called volume reduction or recovery of variable materials. The treatment by the irradiation of the microwave is conducted by introducing a microwave from a microwave oscillator by way of a waveguide tube to the inside of a furnace, matching the microwave by a tuner disposed in the upper portion and the waveguide tube portion at the inside of the furnace, as well as supplying materials to be treated such as incinerated ashes or sludges to the inside of a heating and melting crucible (generally made of metal).

In the microwave melting furnace, a metal crucible is mounted in a furnace body for heating the material to be treated and the material to be treated is supplied continuously into the crucible or charged by a predetermined amount and heated and melted batchwise. A microwave heating and melting furnace of the prior art has a constitution, for example, as shown in FIG. 6. In the figure, an upper furnace body 2 and a lower furnace body 3 are joined to each other by means of a flange 30 in a sealing structure, and the lower furnace body 3 is supported by a jack 4 on a wagon 40. The upper furnace body 2 has a metal waveguide tube 9 connected for introducing microwaves generated from a microwave oscillator not illustrated and also has a hopper 7 supplied by way of a screw feeder 8 for storing material to be treated such as incineration ashes. A protection vessel 5 is mounted at the inside of the lower furnace body 3 and a crucible main body 1 inside of the protection vessel 5 being supported by a flange 10 formed at the upper end thereof. The crucible main body 1 and the protection vessel 5 can be detached easily from the lower furnace body 3 by raising them upward, respectively.

In the constitution described above, the material to be treated containing a salt such as NaNO$_3$ dissolved in a liquid or a liquid such as a sludge suspended therein is treated as shown below.

SUMMARY AND OBJECT OF THE INVENTION

The present invention has been achieved in order to overcome such a drawback in the prior art and it is an object thereof to provide a microwave melting furnace for treating a liquid capable of accurately supplying a liquid to be treated into a crucible.

For attaining the foregoing purpose, the present invention comprises an upper furnace body, a lower furnace body, means for supplying a material to be treated disposed in the upper furnace body, a crucible fed in the lower furnace body, means for detecting the position for the upper surface of the material to be treated supplied into the crucible, and a controller for stopping means for supplying the material to be treated by a detection signal from the detection means. The means for detecting the position for the upper level of the liquid like material to be treated may comprise a gas supply pipe disposed so as to be forwarded to and backwarded from the inside of the crucible, a driving means for forwarding and backwarding the pipe, a gas supply source for supplying a gas to the pipe and a back pressure detector that detects the elevation of a back pressure upon closure of the pipe when the upper surface of the material to be treated reaches the top end of the pipe, and sends a detection signal to the controller. Further, a water supply means may be disposed to the upper furnace body for jetting out water for cleaning inner walls in the crucible.

With the constitutions as described above, when the liquid to be treated supplied into the crucible reaches a predetermined position near the upper surface, the liquid surface detection means detect it and automatically stops the supply of the liquid, thereby surely preventing the liquid supplied into the crucible from overflowing out of the crucible.

DESCRIPTION OF THE ACCOMPANYING DRAWINGS

These and other objects, as well as advantageous features of the present invention will become apparent by reading the following descriptions for the preferred embodiments according to the present invention with reference to the accompanying drawings, wherein FIG. 1 is an explanatory vertical cross sectional view of an entire device illustrating a first embodiment according to the present invention;

FIGS. 2(a)–2(c) are explanatory perspective views illustrating various examples of a pipe constituting a liquid level detection means;

Figure 6:
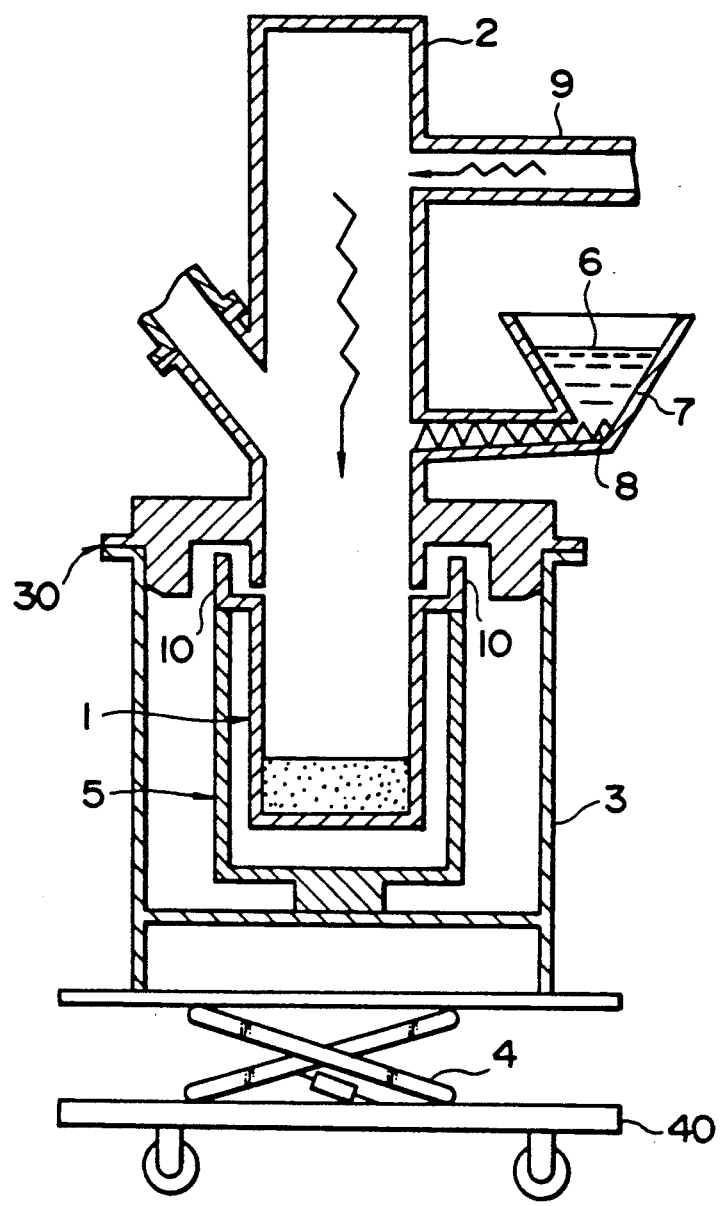

FIGS. 5(a)–5(f) are explanatory views for the function in a crucible in the microwave heating and melting operation of prior arts; and FIG. 6 is a vertical cross sectional view of a microwave heating and melting furnace of the prior art.

In the conventional technique of FIG. 5, a liquid 11 is supplied by a predetermined amount to the crucible main body 1 in a step (a), a microwave is irradiated to apply heating thereby forming a drying product 12 in a step (b), subsequently, an additive material 13 such as glass is supplied in a step (c), the microwave is irradiated again for heating and melting to form a molten product 14 in which the drying product 12 and then the additive material 13 are melted together in a step (d). Next, the liquid 11 is supplied again in a step (e) and then heated in a step (f) to heat and melt both of them, thereby forming a molten product 15. Subsequently, the same procedures are repeated and the operation is continued till the crucible main body 1 is fully charged with the molten product 15.

In the operation described above, while the liquid is supplied into the crucible 1 in the steps 1(a) and (e), the amount of the liquid supplied in this case is different depending on each of the steps and, if the amount of supply is not appropriate, there may be a risk that the liquid 11 overflows out of the crucible 1.

DESCRIPTION OF THE PREFERRED EMBODIMENT

Figure 1:
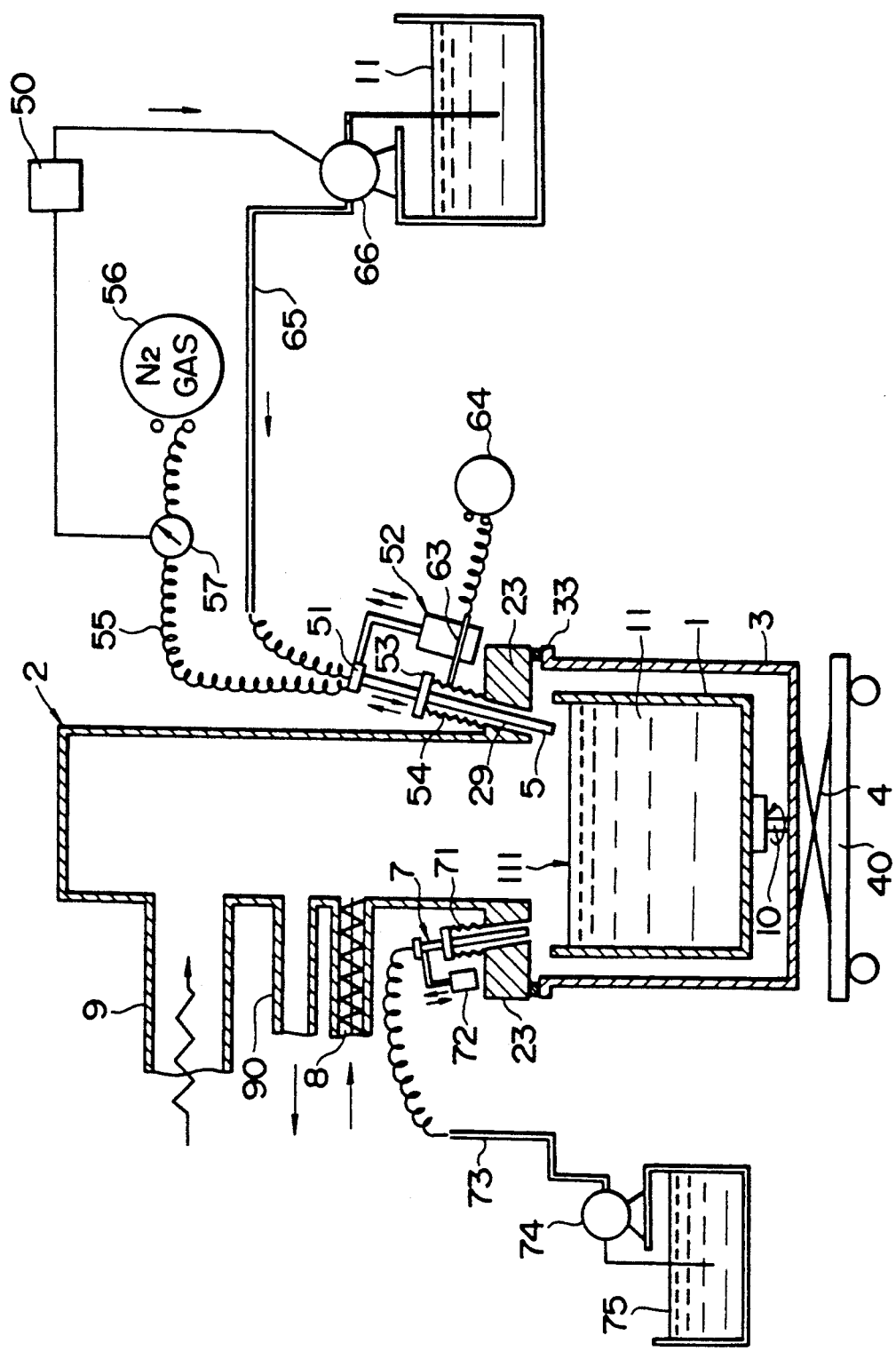

FIG. 1 shows a first embodiment according to the present invention, in which a lower furnace body 3 supported by a jack 4 on a wagon 40 is laid, by means of, a flange 33 at the upper end thereof, over the lower end of an upper furnace body 2 and joined in a sealing structure. A crucible main body 1 is rotatably supported by a shaft 10 in the lower furnace body 3 at the central lower end thereof. The upper furnace body 2 is formed with a microwave guide tube 9, a gas discharge tube 90 and a screw feeder 8 connected to a hopper not illustrated.

The flange 23 is formed with a through hole 29, through which a gas introducing pipe 5 is disposed, and the top end thereof faces to the inside of the crucible main body 1, and the upper end of the pipe 5 is disposed with a flange 51 through which a cylinder (driving means) 52 is connected by way of a flange 51, so that the length protruding into the crucible can be adjusted by forwarding and backwarding the pipe 5 into and from the crucible by means of the cylinder 52. The pipe 5 is connected by way of a pipeline 55 to a gas supply source 56, for example, of a nitrogen gas, and a back pressure detector 57 is disposed in the pipeline 55. A cylindrical cover member 54 of a bellows structure is attached between a flange 53 disposed to an intermediate portion of the pipe 5 and a flange 23 of the upper furnace body 2, for sealing the inside of the furnace. Further, a pipeline 63 connected to a gas supply source 64 is attached to the cylindrical cover 54, so that a gas is always supplied in the cylindrical cover 54 during heat-melting.

Figure 2A:
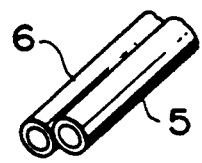
Figure 2B:
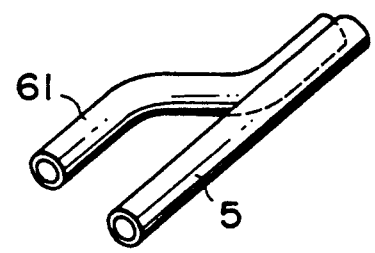
Figure 2C:
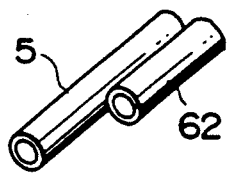

As shown in FIG. 2(a), a liquid supply pipe 6 is attached in parallel with the pipe 5 such that they move together. The pipe 6 is connected by way of a pipeline to a pump 66, by which a liquid 11 of a material to be treated is supplied by way of the pipeline 65 and the pipe 6 to the inside of the crucible main body 1. The pipe 5 and the pipe 6 are brought into contact with each other and top ends of them are aligned in the embodiment shown in FIG. 2(a) Alternatively, a pipe 61 for supplying the liquid may be bent at the top end so that it is apart from the pipe 5 as shown in FIG. 2(b). Further, the pipe 5 may be protruded ahead of the top end of the pipe 62 for supplying the liquid. A controller 50 is connected to the back pressure detector 57, and a pump 66 is connected to the controller 50 so that it is stopped by a detection signal from the back pressure detector 57.

Further, a pipe 7 is attached to and penetrates the flange 23 for supplying purified water 75, and a pump 74 is connected by way of a pipeline 73 to the pipe 7. The pipe 7 is also forwarded and backwarded, like that the pipe 5, by the cylinder 72, and the penetrating portion of the pipe 7 is sealed with a cylindrical cover 71.

Figure 3:
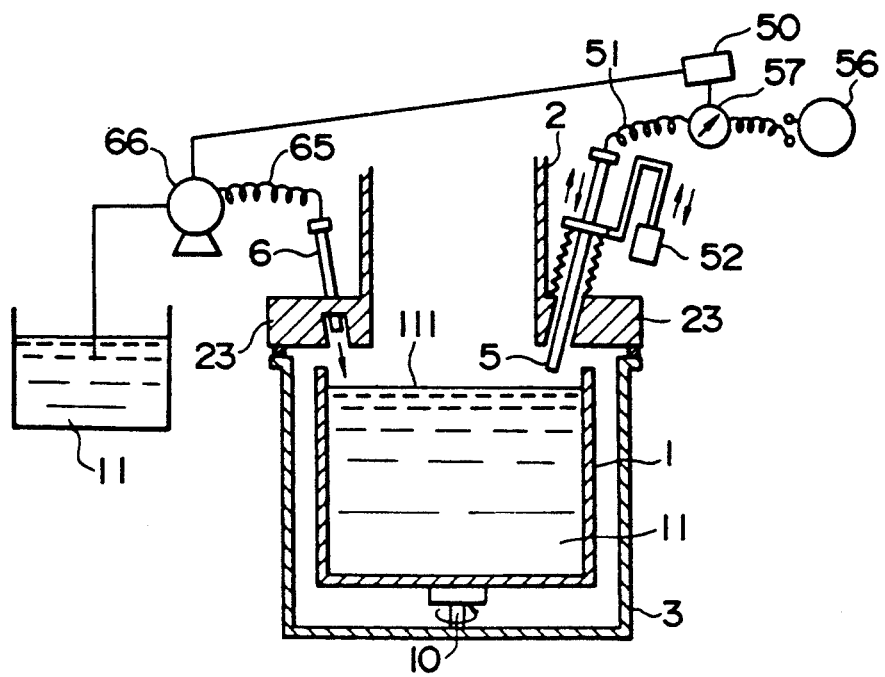
FIG. 3 is an explanatory vertical cross sectional view of an apparatus illustrating another embodiment according to the present invention.

FIG. 3 shows another embodiment of the present invention, in which a liquid supply pipe 6 is attached at a position different from that for the pipe 5 and the pipe 6 is attached fixedly to a flange 23 and only the pipe 5 is forwarded and backwarded. Other constitutions are the same as those in the previous embodiment.

Figure 4:
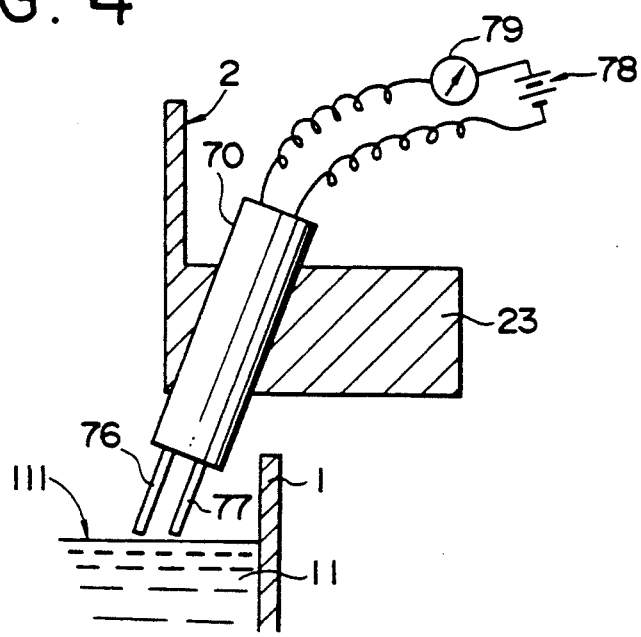
FIG. 4 is an explanatory cross sectional view illustrating another example of a liquid level detection means.
Figure 5A:
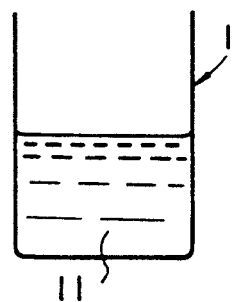
Figure 5B:
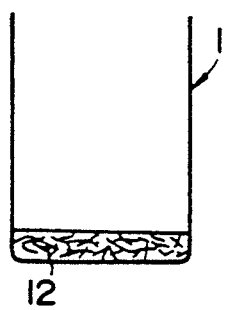
Figure 5C:
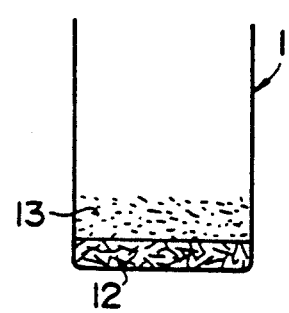
Figure 5D:
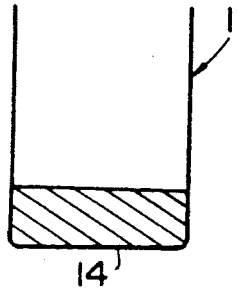
Figure 5E:
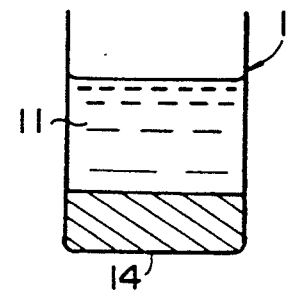
Figure 5F:
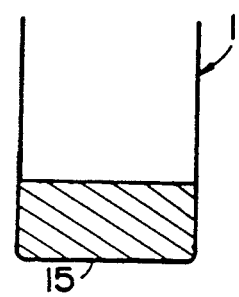

FIG. 4 shows another embodiment of a liquid level detection means in which a holder 70 is penetrated through and attached to a flange 23 of an upper furnace body 2 and a pair of electrodes 76 and 77 held by the holder 70 are disposed while being protruded by a predetermined length into a crucible main body 1. A power source 78 is connected between the electrodes 76 and 77, and a current meter 79 is disposed thereto. The current meter 79 is connected to the controller 50 described previously.

In the embodiment shown in FIG. 1, the top end of the pipe 5 is at first protruded by the cylinder 52 to a predetermined height in the crucible, and a nitrogen gas is supplied from the gas supply source 56 by way of the pipeline 55 and the pipe 5 into the crucible, while the gas is supplied from the gas supply source 64 by way of the pipeline 63 into the cylindrical cover 54. Further, while rotating the crucible main body 1 around the shaft 10 by a driving source not illustrated, flux or the like is supplied from the screw feeder 8, while the liquid 11 to be treated is supplied through the pipeline 65 and the pipe 66 into the crucible main body 1 by driving the pump 66. Then, the material in the crucible is melted under heating by irradiating a microwave through the waveguide tube 9 in accordance with the steps shown in FIG. 5.

When the liquid level 111 of the liquid 11 rises to the top end of the pipe 5, since the jetting port of the pipe 5 is closed, the pressure (back pressure) in the pipeline 55 is elevated, which is detected by the back pressure detector 57 and a detection signal is sent to the controller 50, which stops the pump 66 to terminate the supply of the liquid 11.

Alternatively, the position for stopping the liquid level 111 may be changed by forwarding or backwarding the pipe 5, so that the amount of the liquid 11 to be supplied may be controlled in each of the steps, in addition to the prevention for the overflowing.

In the device shown in FIG. 3, the operations are conducted in the same manner as described above excepting that the pipe 6 for the liquid 11 is fixed to the flange 23 and only the pipe for the gas moves vertically.

In the embodiment shown in FIG. 4, a current is caused when the liquid level 111 is elevated and brought into contact with both of the electrodes 76 and 77, and the controller 50 stops the pump 66 by the signal from the current meter 79 that detects the contact. Further, various liquid level detection means such as of an electrostatic capacitance type can also be adopted.

During the operations described above, salts such as sodium nitrate are crystallized and deposited to the inner surface of the crucible main body 1, which form convex protrusions to cause electric discharge, so that the microwave is absorbed to worsen the matching property of the microwave in the furnace. In order to avoid such a phenomenon, purified water 75 is blown by the pump 77 to the inner surface of the crucible through the pipeline 73 and the pipe 7 to dissolve the deposition products.

As has been described above according to the present invention, when the liquid to be treated supplied to the crucible reaches a predetermined position near the upper surface of the crucible, the liquid level detection means detects this and automatically stops the supply of the liquid. Therefore, the liquid supplied into the crucible can be prevented surely from overflowing out of the crucible.

In the embodiments described above, only one liquid level detection means is disposed. However, when a plurality of liquid level detection means corresponding to various levels are disposed, even if one of the liquid level detection means fails for detection, liquid level can be detected surely by other liquid level detection means.

What is claimed is:

1. A microwave melting furnace for treating a liquid, comprising an upper furnace body, a lower furnace body, supplying means disposed to said upper furnace body for supplying liquid to be treated, a crucible disposed in said lower furnace body, means for detecting positions for the upper surface of the liquid to be treated supplied into said crucible and a controller for stopping said supplying means for supplying the liquid to be treated depending on a detection signal from said detecting means.

2. A microwave melting furnace for treating a liquid as defined in claim 1, wherein the means for detecting the position for the upper surface of the material to be treated comprises a gas supply pipe disposed to be forwarded to and retracted from the inside of the crucible, a driving means for forwarding and backwarding said pipe, a gas supply source for supplying a gas to said pipe and a back pressure detector that detects elevations of a back pressure generated upon closure of said pipe when the upper surface of the liquid to be treated reaches the top end of said pipe and sends a detection signal to said controller.

3. A microwave melting surface for treating a liquid as defined in claim 1 or 2, wherein a water supply means is disposed to the upper furnace body for spraying water for cleaning an inner wall into the crucible.

* * * * *